Figure 1:
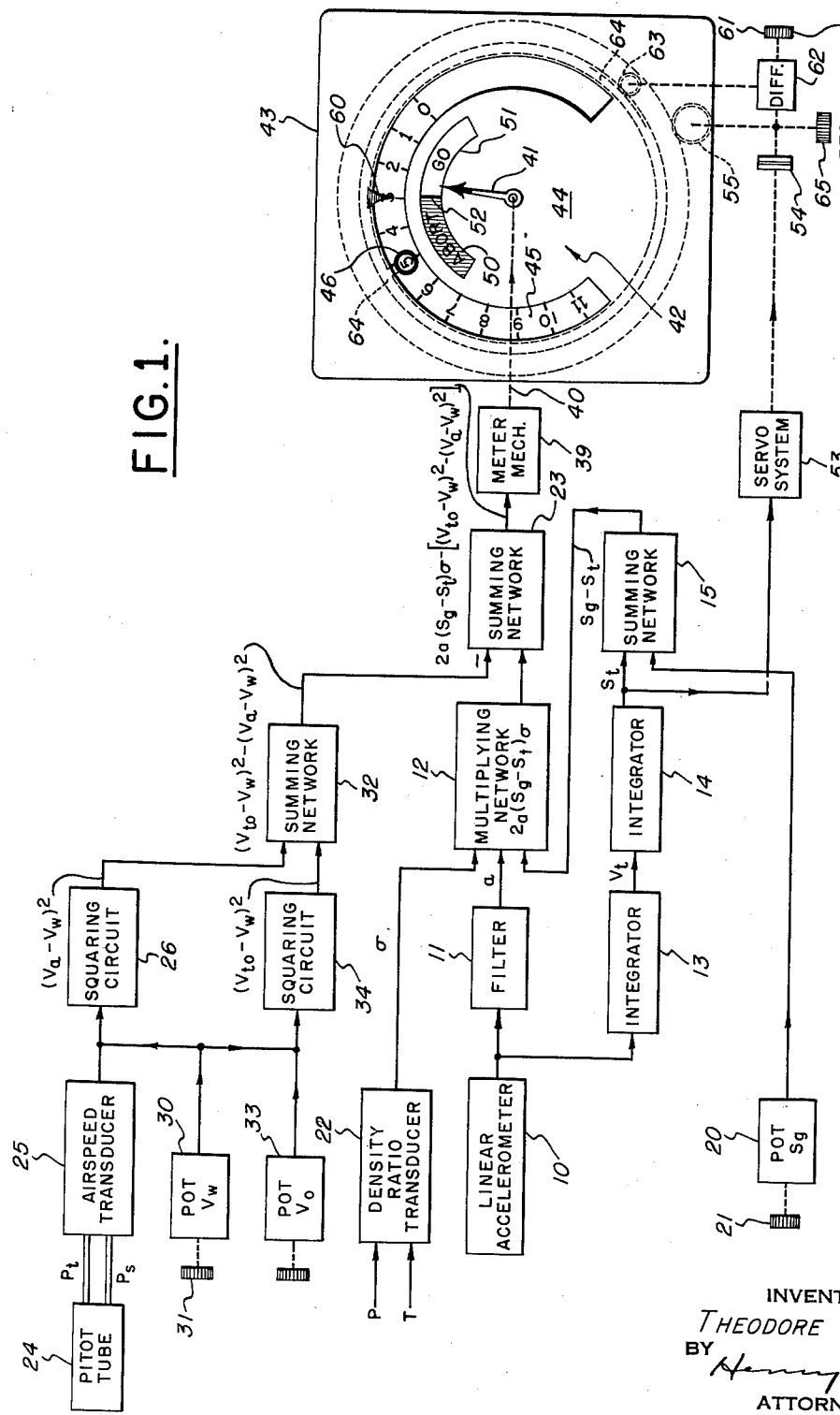

Feb. 12, 1963
T. GOLD
3,077,110
SYSTEM FOR MONITORING THE TAKE-OFF
PERFORMANCE OF AN AIRCRAFT
Filed June 29, 1959
2 Sheets-Sheet 2
FIG.2.
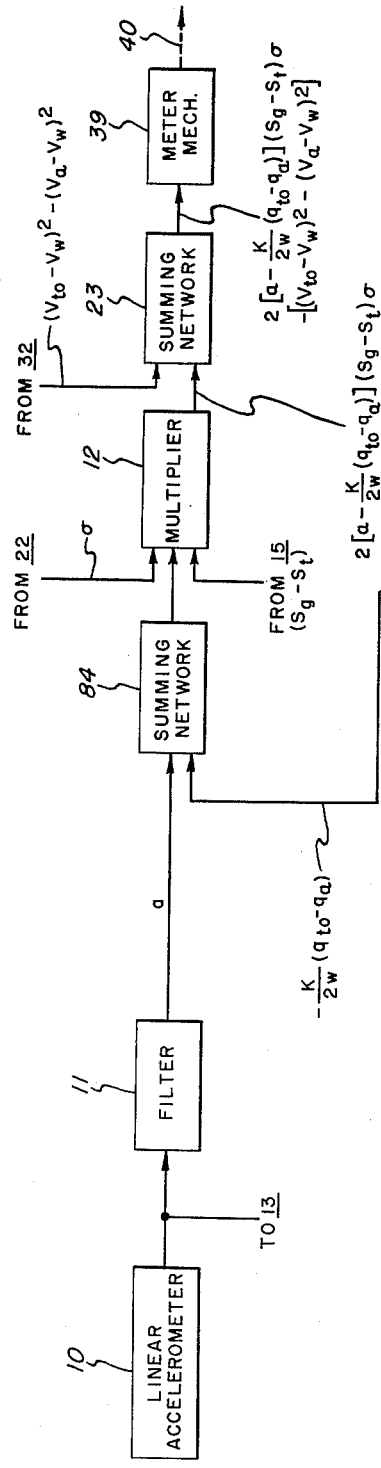
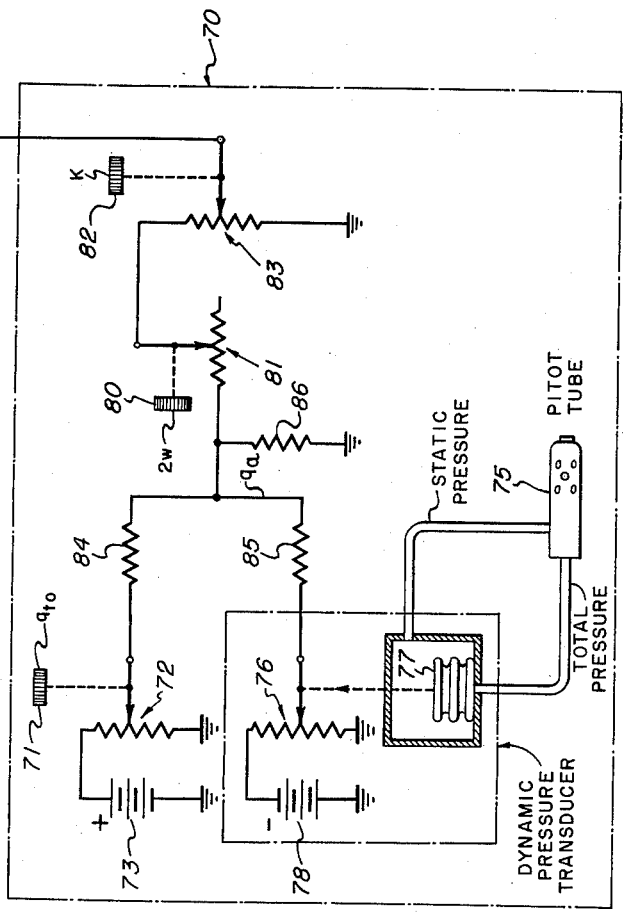
INVENTOR
*THEODORE GOLD*
BY
ATTORNEY United States Patent Office 3,077,110
Patented Feb. 12, 1963

3,077,110
SYSTEM FOR MONITORING THE TAKE-OFF
PERFORMANCE OF AN AIRCRAFT
Theodore Gold, Ronkonkoma, N.Y., assignor to Sperry
Rand Corporation, Great Neck, N.Y., a corporation of
Delaware
Filed June 29, 1959, Ser. No. 823,753
12 Claims. (Cl. 73—178)

This invention relates to a system for monitoring the take-off performance of an aircraft. In particular it concerns a system for accurately providing a continuous indication of the actual performance of the aircraft during the take-off run for purposes of determining whether the aircraft will become safely airborne within the runway distance available.

Several techniques are currently used to monitor the performance of an airplane during take-off. In one system, the pilot refers to performance charts to determine the air speed which should be attained by the time the aircraft reaches a predetermined point on the runway. The pilot then compares the actual indicated air speed with the desired air speed at the reference point. This requires the pilot to refer to a visual check point outside the cockpit at a time when his attention is drawn to many other instruments within the cockpit. A further limitation of this system is that the pilot has no way of monitoring performance of the craft during the take-off run until the check point is reached. Since the check point and the point at which he must render a decision to continue or abort are close together, it leaves him little time to arrive at a decision in the event performance is marginal. Further, the actual air speed may exceed the required air speed at the check point although a failure has been experienced which will prevent the aircraft from taking off safely.

Other take-off monitoring systems sense the actual longitudinal acceleration of the aircraft as it proceeds down the runway during the take-off. One system of this type is disclosed in the National Advisory Committee for Aeronautics Technical Note 3252, entitled, "Description and Preliminary Flight Investigation of an Instrument for Detecting Subnormal Acceleration During Take-Off," written by Garland J. Morris and Lindsay J. Lina, dated November 1954. The aforementioned Technical Note 3252 described an instrument utilizing a linear accelerometer and a pressure diaphragm coupled together so that the normal decrease in acceleration with increasing velocity during take-off is compensated by the increase in dynamic pressure in order to give a constant predictable indicator reading as long as the thrust and resistance are normal. It will be appreciated that this instrument merely provides an indication of the instantaneous longitudinal acceleration being experienced by the craft during the take-off. One limitation of the aforementioned instrument is that the actual acceleration during take-off may fluctuate above and below the require acceleration. With instantaneous acceleration being compared with a standard, the pilot has the burden of mentally evaluating whether or not the average acceleration to some point down the runway is satisfactory. If the average acceleration is subnormal, but at the time the pilot takes a reading the instantaneous acceleration is normal, there is an indication given to the pilot that he can safely take off when in reality the air speed of the craft will be inadequate for safe take-off.

Another system which senses the actual longitudinal acceleration of the craft as it proceeds down the runway but overcomes the above limitations is disclosed in co-pending application S.N. 613,104, filed October 1, 1956, now Patent No. 3,034,096.

Aircraft performance on the runway during the take-off can also be measured by remote external means such as radar or the transmission of impulses as the aircraft passes fixed positions. However, this requires a communication link to the aircraft as well as a siutable aircraft display. Use of this type of equipment makes aircraft take-off monitoring contingent on the performance of ground based equipment and requires additional airfield facilities.

It is therefore a primary object of the present invention to provide a take-off monitoring system for aircraft that continuously monitors the performance of the aircraft during the take-off run and provides an instantaneous indication of changes in said performance.

It is an additional object of the present invention to provide a take-off monitoring system for aircraft that provides an indication of the relative magnitude of a signal representative of twice the forward acceleration of the craft multiplied by the remaining runway distance to be traversed with that of a signal representative of the difference between the square of the speed required for the craft to become airborne and the square of the actual speed of the craft.

The above objects are achieved by the present invention by a system which senses the forward acceleration and the air speed of the aircraft during the take-off. Means responsive to the forward acceleration provides a first signal representative of the product of twice the forward acceleration and the distance to be traversed under the prevailing conditions. Means responsive to the air speed provides a second signal representative of the difference between the square of the speed required for the craft to become airborne and the square of the actual speed of the craft. The aforementioned signals are compared to provide a control signal representative of the difference therebetween. When the first signal is equal to or greater than the second signal, the control signal is utilized to drive a pointer which provides an indication that a take-off may be executed safely. On the other hand when the first signal is less than the second signal, the control signal is utilized to drive the pointer to provide an indication that the take-off should be discontinued, or that additional distance along the runway will be required to become airborne. An indication is provided of the distance traversed as well as the distance to be traversed. An indication of the check line position is also provided. When the acceleration characteristic of the aircraft decreases appreciably during the take-off run, additional means are provided for obtaining a signal representative of the average acceleration which is utilized for monitoring purposes.

The forward acceleration required for an aircraft to increase its ground speed from $V_1$ to $V_2$ within a distance $S$ is $$a = \frac{V_2^2 - V_1^2}{2S}$$

The required acceleration from time $t$ to reach the take-off velocity $V_{to}$ when the actual air speed of the aircraft is $V_a$ and the distance actually traversed from initiation of the take-off run is $S_t$ is $$a = \frac{(V_{to} - V_w)^2 - (V_a - V_w)^2}{2(S_g - S_t)\sigma}$$

where the runway component of wind is $V_w$, the take-off distance is $S_g$ and $\sigma$ is the air density ratio for the prevailing pressure and temperature conditions at the runway.

By monitoring the sensed forward acceleration of the craft, the success of the take-off performance may be predicted in accordance with the following equation:

When $$[2a(S_g - S_t)\sigma] \geq (V_{to} - V_w)^2 - (V_a - V_w)^2$$

a successful take-off may be performed within the allocated take-off distance.

The invention will now be described with reference to the following drawings in which:

FIG. 1 is a schematic block diagram of a preferred embodiment of a take-off monitoring system, and FIG. 2 is an alternative embodiment of the system of FIG. 1.

Referring now to FIG. 1, a linear accelerometer 10 is mounted in the craft with its sensitive axis disposed parallel with respect to the horizon in order that it is responsive only to the forward acceleration experienced by the craft and provides a signal having a magnitude proportional to the magnitude of the forward acceleration. The accelerometer 10 is connected to a filter 11 where the acceleration signal is filtered before it is applied to an input terminal of a multiplying network 12. The accelerometer 10 is also connected to an integrator 13 which integrates the acceleration signal to provide a signal representative of the forward velocity of the craft. This integrator 13 is connected to an integrator 14 which integrates the velocity signal to provide a signal representative of the distance actually traversed by the craft from the beginning of the take-off run $S_t$. The integrators 13 and 14 may be, for example, electromechanical integrating devices. The integrator 14 is connected to an input terminal of a summing network 15.

A potentiometer 20 is connected to another input terminal of the summing network 15. The potentiometer 20 provides a signal representative of the distance to be traversed by the aircraft from the beginning of the take-off run until the aircraft becomes airborne, which is known as the take-off distance $S_g$. Manual adjustment of a knob 21 of the potentiometer 20 provides a signal having a magnitude representative of the take-off distance. The summing network 15 is connected to another input terminal of the multiplying network 12. The distance traversed signal $S_t$ is applied to the summing network 15 in opposition to the take-off distance signal $S_g$. The output of the summing network 15 is a signal representative of the take-off distance $S_g$ minus the distance traversed $S_t$.

An air density ratio transducer 22 which is responsive to the prevailing static pressure and temperature conditions is connected to a third input terminal of the multiplying network 12. The transducer 22 provides a signal representative of the prevailing air density. The multiplying network 12 is connected to an input terminal of a summing network 23. The signal provided by the multiplying network 12 is representative of twice the multiple of the forward acceleration multiplied by the distance remaining to be traversed as corrected by the prevailing air density.

A pitot tube 24 is mounted on the exterior of the aircraft to provide pressures representative of the total pressure and the static pressure experienced by the aircraft to an air speed transducer 25. The air speed transducer 25 provides a signal having a magnitude representative of the actual air speed of the craft. The air speed transducer 25 is connected to a squaring circuit 26. A potentiometer 30 is connected to the squaring circuit 26 to provide a signal in opposition to the signal provided by the air speed transducer 25. The potentiometer 30 is manually adjusted by a knob 31 to provide a signal from the potentiometer 30 having a magnitude representative of the component of the prevailing head wind parallel with the runway. The signal applied to the squaring circuit 26 is therefore representative of the actual ground speed of the aircraft, i.e., the difference between the actual air speed and the component of the prevailing wind. The signal representative of the aircraft ground speed is squared in the squaring circuit 26.

The squaring circuit 26 is connected to an input terminal of a summing network 32. A potentiometer 33 is connected to a squaring circuit 34. Manually adjusting knob 35 of the potentiometer 33 provides a signal from the potentiometer 33 having a magnitude representative of the air speed required for the aircraft take-off within the allocated take-off distance with the prevailing atmospheric density. The potentiometer 30 is also connected to provide a signal in opposition to the signal provided by the potentiometer 33 to the squaring circuit 34. The signal into the squaring circuit 34 is therefore representative of the take-off ground speed, i.e., the difference between the required air speed and the component of the prevailing head wind parallel to the runway. The take-off ground speed signal is squared in the squaring circuit 34. The squaring circuit 34 is connected to another input terminal of the summing network 32. The signal provided by the summing network 32 is representative of the required take-off ground speed squared minus the actual ground speed squared. The summing network 32 is connected to the summing network 23 to provide a signal in opposition to that supplied by the multiplying network 12.

The summing network 23 provides a control signal representative of twice the forward acceleration times the remaining runway distance before take-off times the density ratio minus the difference between the square of the required ground speed and the actual ground speed. The summing network 23 is connected to energize a meter mechanism 39 in accordance with the control signal. The meter mechanism 39 is mechanically connected by a shaft 40 to a pointer 41.

The pointer 41 forms a portion of the display, generally indicated at 42, of the take-off monitor instrument of the present invention. The display 42 is viewable through an opening in the instrument housing 43 which is mounted preferably on the cockpit instrument panel. The display also includes a disc 44, a rotatable distance card 45, and a rotatable check line index 46.

The pointer 41 is rotatable on the face of the instrument by means of the shaft 40 which protrudes through an aperture in the center of the disc 44. The pointer 41 is cooperative with indicia 50 and 51 which are painted on the disc 44. The indicium 50, for example, may be painted red or cross-hatched while the indicium 51 is painted a contrasting color such as green or a solid color, respectively, to provide a prominent line of demarcation 52 therebetween. The extremity of the pointer 41 is so disposed and rotatable as to lie adjacent one of the indicium 50 or 51 during the operation of the instrument as will be described.

To provide an indication of the distance traversed as well as the distance remaining to be traversed before take-off, the integrator 14 is connected to a servo system 53 which in turn is connected to drive the distance card 45 through a slip clutch 54 and gearing 55. The servo system 53 rotates the distance card 45 in a clockwise direction proportional to the distance actually traversed by the aircraft from the beginning of the take-off run. The distance card 45 has graduations thereon representative of distance in thousands of feet which are cooperative with a fixed lubber line 60.

As the aircraft proceeds down the runway during the take-off run, a point is reached at which the pilot must decide whether to continue the take-off in a normal manner to become airborne, or to discontinue the take-off. The point along the runway at which this decision is made must allow sufficient remaining runway distance to bring the aircraft to a safe stop on the runway. This point along the runway is known as the check line. The distance from the beginning of the take-off run to the check line is the check line distance. The check line index 46 in cooperation with the card 45 provides an indication of the check line distance. A check line select knob 61 is connected through a differential 62 to a pinion gear 63 which drives a ring gear 64. The check line index 46 is mounted upon and rotates with the gear 64.

The check line index 46 is cooperative with the distance indications on the distance card 45. Manually adjusting the knob 61 rotates the index 46 until it is aligned with the correct distance on the card 45. Thereafter, the card 45 and the index 46 are synchronously driven in a clockwise direction by the servo system 53; the latter through the slip clutch 54, differential 62, pinion gear 63 and ring gear 64. The check line index 46 is also cooperative with the lubber line 60.

A reset knob 65 is connected to the card 45 by means of the gearing 55 and to the index 46 through the differential 62; pinion gear 63 and ring gear 64. Manual adjustment of the reset knob 65 rotates the card 45 and the index 46 for resetting at the beginning of a take-off run. The slip clutch 54 prevents any damage to the servo system 53 during the reset adjustment.

In the operation of the system of the present invention, at the beginning of the take-off run, the reset knob 65 is manually adjusted to rotate the card 45 until its zero graduation lies beneath the lubber line 60. The check line select knob 61 is then manually adjusted to rotate the check line index 46 until it lies adjacent the distance on the card 45 representative of the check line distance. The knob 31 of the potentiometer 30 is adjusted in accordance with the runway component of the prevailing wind. The knob 35 of the potentiometer 33 is adjusted in accordance with the air speed required for the aircraft to become airborne under the prevailing conditions. The knob 21 of the potentiometer 20 is adjusted in accordance with the take-off distance.

As the aircraft proceeds along the runway at the beginning of the take-off run, the accelerometer 10 senses the forward acceleration experienced by the craft and provides a signal representative thereof. The acceleration is filtered in the filter 11 to eliminate the effect of high frequency components thereof before it is applied to the multiplying network 12. The acceleration signal is also integrated in the integrator 13 and again in the integrator 14 to provide a signal representative of the distance traversed by the aircraft from the beginning of the take-off run to the summing network 15. The output signal of the summing network 15 is representative of the distance remaining to be traversed and is applied to the multiplying network 12. The signal representative of the air density ratio from the transducer 22 is also applied to the multiplying network 12.

The total and static pressure experienced by the aircraft is sensed by the pitot tube 24 and converted to an electrical signal representative of the actual air speed of the craft by the transducer 25. The actual air speed signal is applied to the squaring circuit 26 along with a corrective signal representative of the prevailing wind condition. The difference therebetween is squared in the circuit 26 and applied to the summing network 32. The signal representative of the required take-off speed corrected for the prevailing wind conditions is squared in the squaring circuit 34 and also applied to the summing network 32. The output of the summing network 32 is representative of the difference between the square of the required take-off speed and the square of the actual speed of the craft and is applied to the summing network 23 in opposition to the output signal from the network 12. The summing network 23 provides a control signal representative of the difference between its input signals to energize the meter mechanism 39. The meter mechanism 39 drives the pointer 41 accordingly to provide a continuous measure of the aircraft performance.

When the signal from the network 12 is equal to the signal from the network 32, the pointer 41 is aligned with the demarcation line 52 indicating performance is adequate and a take-off may be executed safely within the allocated runway distance. When the signal from the network 12 has a magnitude greater than the magnitude of the signal from the network 32, the forward acceleration of the aircraft over the remaining runway distance will be more than adequate to achieve the required airborne speed of the craft within the take-off distance in view of its present speed. Under these circumstances, the pointer 41 is driven in a clockwise direction beyond the line 52 and will be adjacent the indicium 51 indicating a take-off may be safely executed.

When the signal from the network 12 has a magnitude less than the signal from the network 32, the acceleration of the craft is inadequate to achieve the necessary take-off speed within the predetermined take-off distance in view of the present speed of the craft. The pointer 41 will therefore be driven to lie adjacent the indicium 50 indicating that performance is submarginal. The pilot then has the option of discontinuing the take-off early in the take-off run or continuing the take-off to see if performance will improve by the time the check line is reached. At the check line or shortly thereafter, a final decision must be made.

The position of pointer 41 with respect to the indicia 50 and 51 and the demarcation line 52 provides an indication of the relative performance of the aircraft. For example, indicium 51 may be so designed that with pointer 41 adjacent the center thereof, the aircraft performance is 10% above normal. Correspondingly, with pointer 41 adjacent the center of the indicium 50, the aircraft performance is 10% below normal. The relative performance of the aircraft is related to the distance required for take-off. For example, in certain aircraft, a 7% decrease in performance requires a 10% increase in take-off distance for the craft to become airborne. By this means, the pilot may assess the subnormal performance of the craft in terms of the additional runway distance required to become airborne and reach a decision accordingly.

As the aircraft proceeds along the runway during the take-off run, the distance traversed signal from the integrator 14 energizes the servo system 53 which rotates the card 45 in a clockwise direction by means of the gearing 55. The card 45 continuously provides an indication of the distance traversed and the distance to be traversed by cooperation of the graduations thereon with the lubber line 60. The servo system 53 also drives the check line index 46 synchronously with the card 45 through the differential 62 and gearing 63 and 64.

When the check line index 46 becomes aligned with the lubber line 60, the pilot must render a final decision regarding continuance or discontinuance of the take-off based on the aforementioned considerations.

It will be obvious to those skilled in the art that the specific design of the indicia 50 and 51 and the position of the demarcation line 52 will be dependent upon the type of aircraft in which the take-off monitor system is utilized and the considerations governing the check line point.

The acceleration characteristics of many aircraft remain substantially constant during the take-off run in which event the above-described take-off monitoring system provides a continuous accurate indication of aircraft performance. In certain aircraft however, as the airplane proceeds down the runway, the acceleration characteristic decreases appreciably due to changes in the aerodynamic drag and engine thrust with increasing air speed. With aircraft of the latter type, it is preferable to utilize the average acceleration in lieu of the actual acceleration. The average acceleration may be calculated by subtracting from the instantaneous acceleration one-half the anticipated decrease of acceleration measured as a function of the difference in dynamic pressure from the value at the present position of the aircraft to the value at take-off. For a linear variation of acceleration $$a_x = a_o - \frac{K}{W}q$$

where $a_x$ = forward horizontal acceleration
$a_o$ = initial acceleration at $q$ equals zero $q$ = dynamic pressure ($\tfrac{1}{2}\rho_0 V_e^2$)
$\rho_o$ = atmospheric density for standard sea level conditions
$V_e$ = equivalent air speed
$W$ = gross weight of the aircraft
$K$ = dynamic pressure compensating factor
where $$K = q\left[ AC_D - \mu C_L A + \frac{2}{\rho_o}\frac{dT}{dV_e^2}\right]$$

where
$G$ = gravitational constant
$A$ = wing area of the aircraft
$C_D$ = drag coefficient of the aircraft
$\mu$ = coefficient of rolling resistance between the tires and the runway
$C_L$ = lift coefficient of the aircraft
$T$ = thrust The decrease in acceleration between $q_a$ and $q_{to}$ is then $$\frac{K}{W}(q_{to}-q_a)$$

The average acceleration is then the present acceleration less $$\frac{1}{2}\frac{K}{W}(q_{to}-q_a)$$

where
$q_{to}$ = dynamic pressure at take-off
$q_a$ = actual dynamic pressure
The monitoring function for the take-off monitor system then becomes $$2\left[a - \frac{1}{2}\frac{K}{W}(q_{to}-q_a)\right](S_g - S_t)\sigma \gtreqqless (V_{to}-V_w)^2 - (V_a-V_w)^2$$

Referring now to FIG. 2 an embodiment of the invention will be described which utilizes a signal representative of the average acceleration to monitor take-off performance. The system of FIG. 2 is the same as that of FIG. 1 with the exception that a signal representative of $$-\frac{K}{2W}(q_{to}-q_a)$$

is applied to the system of FIG. 1. This signal is obtained from a computer network generally indicated at 70.

A signal representative of the $q_{to}$ term is provided by manually adjusting a knob 71 to position the slider of a potentiometer 72. A positive D.-C. voltage source 73 is applied across the resistive winding of the potentiometer 72. A signal representative of the actual dynamic pressure $q_a$ is obtained from a dynamic pressure transducer 74. The dynamic pressure transducer 74 is responsive to the actual static and total pressure as obtained from a Pitot tube 75 mounted on the exterior of the craft. The transducer 74 positions the slider of a potentiometer 76 in accordance with dynamic pressure by means of a bellows 77. A negative D.-C. voltage source 78 is applied across the resistive winding of the potentiometer 76.

A signal representative of twice the gross weight 2W is obtained by manually adjusting a knob 80 which positions the slider of a potentiometer 81. A signal representative of the K term is provided by manually adjusting a knob 82 to position the slider of a potentiometer 83. As indicated above, the K factor depends upon the aerodynamic characteristics of the particular aircraft which can be obtained by reference to manufacturer's data.

The potentiometers 72, 76, 81 and 83 are interconnected by means of resistors 84, 85 and 86 to form the D.-C. computer network 70 which provides a signal representative of $$\frac{K}{2W}(q_{to}-q_a)$$

In operation, the $q_{to}$ signal is connected through the isolation resistor 84 and the summing resistor 86 to ground potential while the $-q_a$ signal is connected through the isolation resistor 85 and the summing resistor 86 to ground potential. The signal representative of $q_{to}-q_a$ is applied across the resistive winding of the potentiometer 83 as modified by the position of the slider of the potentiometer 81.

The output terminal of the computer network 70 is connected to an input terminal of a summing network 87. The other input terminal of the summing network 87 is connected to receive the filtered acceleration signal from the linear accelerometer 10 via the filter 11. The signal from the network 70 is connected to the summing network 87 in opposition to the acceleration signal from the accelerometer 10. The output terminal of the summing network 87 is connected to an input terminal of the multiplier 12.

As described previously with respect to FIG. 1, the other input terminals of the multiplier 12 are connected to the output terminals of the air density ratio transducer 22 and the summing network 15 respectively. The multiplier network 12 is connected to an input terminal of the summing network 23 to provide a signal representative of twice the average forward acceleration multiplied by the distance remaining to be traversed as corrected by the prevailing atmospheric conditions, i.e.

$$2\left[a - \frac{K}{2W}(q_{to}-q_a)\right](S_g - S_t)\sigma$$

The other input terminal of the summing network 23 is connected to the output terminal from the network 32. The summing network 23 provides a control signal to the meter mechanism 39 representative of twice the average acceleration times the remaining runway distance before take-off times the density ratio minus the difference between the square of the required ground speed and the actual ground speed. The meter mechanism 39 drives the pointer 41 by means of the shaft 40 in accordance with this control signal in a manner similar to that described with respect to the embodiment shown in FIG. 1.

The operation of the system of FIG. 2 is the same as that described above with respect to FIG. 1 except the display 42 now provides a comparison of the aircraft performance in terms of the average acceleration which compensates for the decreasing acceleration characteristic of the craft.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. A system for monitoring the performance of an aircraft during the take-off run comprising acceleration responsive means mounted on said craft for providing a signal representative of the forward acceleration experienced by said craft, means for providing a signal representative of the remaining distance to be traversed before take-off at the prevailing air density conditions, means responsive to said acceleration and distance signals for providing a first signal representative of a function of the product thereof, speed responsive means mounted on said craft for providing a signal representative of the actual speed of the craft, means for providing a signal representative of the speed required for said craft to become airborne, means responsive to said required speed signal and said actual speed signal for providing a second signal representative of the difference between a function of the required speed signal and a function of the actual speed signal, and means responsive to said first and second signals for providing a measure repre- sentative of the difference therebetween whereby the performance of the aircraft may be monitored.

2. A system for monitoring the performance of an aircraft during the take-off run comprising means including acceleration responsive means mounted on said craft for providing a signal representative of the average forward acceleration experienced by said craft, means for providing a signal representative of the remaining distance to be traversed before take-off at the prevailing air density conditions, means responsive to said acceleration and distance signals for providing a first signal representative of a function of the product thereof, speed responsive means mounted on said craft for providing a signal representative of the actual speed of the craft, means for providing a signal representative of the speed required for said craft to become airborne, means responsive to said required speed signal and said actual speed signal for providing a second signal representative of the difference between a function of the required speed signal and a function of the actual speed signal, and means responsive to said first and second signals for providing a measure representative of the difference therebetween whereby the performance of the aircraft may be monitored.

3. A system for monitoring the performance of an aircraft during the take-off run comprising acceleration responsive means mounted on said craft for providing a signal representative of the forward acceleration experienced by said craft, means for providing a signal representative of the remaining distance to be traversed before take-off at the prevailing air density conditions, means responsive to said acceleration and distance signals for providing a first signal representative of a function of the product thereof, speed responsive means mounted on said craft for providing a signal representative of the actual speed of the craft, means for providing a signal representative of the speed required for said craft to become airborne, means responsive to said required speed signal and said actual speed signal for providing a second signal representative of the difference between a function of the required speed signal and a function of the actual speed signal, means responsive to said first and second signals for providing a measure representative of the difference therebetween, and display means including means responsive to said measure for monitoring the performance of the aircraft.

4. A system of the character described in claim 3 in which said display means includes means responsive to the actual distance traversed for providing an indication thereof.

5. A system of the character described in claim 4 including means for selectively positioning an index in accordance with the check line distance, said index being cooperative with said distance traversed indication means and movable therewith after being initially set.

6. A system for monitoring the performance of an aircraft during the take-off run comprising acceleration responsive means mounted on said craft for providing a signal representative of the forward aceleration experienced by said craft, computer means for providing a signal representative of the average decrease in forward acceleration to be expected during the remaining portion of the take-off, means for providing a signal representative of the remaining distance to be traversed before take-off at the prevailing air density conditions, means responsive to said acceleration, decrease in acceleration, and distance signals for providing a first signal representative of a function of said acceleration, decrease in acceleration, and distance signals, speed responsive means mounted on said craft for providing a signal representative of the actual speed of the craft, means for providing a signal representative of the speed required for said craft to become airborne, means responsive to said required speed signal and said actual speed signal for providing a second signal representative of the difference between a function of the required speed signal and a function of the actual speed signal, means responsive to said first and second signals for providing a measure representative of the difference therebetween, and display means including means responsive to said measure for monitoring the performance of the aircraft.

7. A system for monitoring the performance of an aircraft during the take-off run comprising acceleration responsive means mounted on said craft for providing a signal representative of the forward acceleration experienced by the craft, means for providing a signal representative of the distance along the runway to be traversed during the take-off run, means responsive to said acceleration signal for providing a signal representative of the distance actually traversed, means responsive to the distance to be traversed and the distance actually traversed signals for providing a signal representative of the difference therebetween, means responsive to the prevailing air density conditions for providing a signal in accordance therewith, multiplying means responsive to said acceleration, difference in distance and air density signals for providing a signal representative of twice the product thereof, air speed responsive means mounted on said craft for providing a signal representative thereof, means for providing a signal representative of the required take-off speed of the craft, means connected to said air speed responsive means and said required take-off speed signal producing means for providing a correction signal representative of the component of the prevailing wind, first squaring means responsive to said corrected air speed signal for providing a first signal representative of the square thereof, second squaring means responsive to the corrected required take-off speed signal for providing a second signal representative of the square thereof, means responsive to said first and second squared signals for providing a signal representative of the difference therebetween, means responsive to said product signal and said square difference signal for providing a control signal representative of the difference therebetween, and means responsive to said control signal for providing a measure thereof whereby the performance of the aircraft may be monitored.

8. A system of the character described in claim 7 including means responsive to the distance traversed signal for providing an indication representative thereof.

9. A system of the character described in claim 7 wherein said last-mentioned means includes a meter movement responsive to said control signal which actuates a pointer in accordance therewith, and display means cooperative with said pointer whereby an indication of the relative performance of the aircraft is provided.

10. A system of the character described in claim 9 wherein said display includes distance traversed indicating means driven in accordance with said distance traversed signal.

11. A system of the character described in claim 10 including means for positioning an index in accordance with the check line distance, said index being cooperative with said distance traversed indicating means.

12. A system for monitoring the performance of an aircraft during the take-off run comprising acceleration responsive means mounted on said craft for providing a signal representative of the forward acceleration experienced by the craft, means including means responsive to the actual dynamic pressure for providing a signal representative of the average decrease in forward acceleration to be expected during the remaining portion of the take-off as a function of the difference between the dynamic pressure at take-off and the actual dynamic pressure, means for providing a signal representative of the distance along the runway to be traversed during the take-off run, means responsive to said acceleration signal for providing a signal representative of the distance actually traversed, means responsive to the distance to be traversed and the distance actually traversed signals for providing a signal representative of the difference therebetween, means responsive to the prevailing air density conditions for providing a signal in accordance therewith, multiplying means responsive to said acceleration, decrease in acceleration, difference in distance and air density signals for providing a signal representative of a function of said acceleration, decrease in acceleration, difference in distance and air density signals, air speed responsive means mounted on said craft for providing a signal representative thereof, means for providing a signal representative of the required take-off speed of the craft, means connected to said air speed responsive means and said required take-off speed signal producing means for providing a correction signal representative of the component of the prevailing wind, first squaring means responsive to said corrected air speed signal for providing a first signal representative of the square thereof, second squaring means responsive to the corrected required take-off speed signal for providing a second signal representative of the square thereof, means responsive to said first and second squared signals for providing a signal representative of the difference therebetween, means responsive to said product signal and said squared difference signal for providing a control signal representative of the difference therebetween, and means responsive to said control signal for providing a measure thereof whereby the performance of the aircraft may be monitored.

References Cited in the file of this patent

UNITED STATES PATENTS 2,613,071 Hansel _____ Oct. 7, 1952
2,922,982 Hoekstra _____ Jan. 26, 1960

OTHER REFERENCES

NACA Technical Note 3252, November 1954. (Copy in Scientific Library TL 521 U58.)

Klass: Monitor Designed to Aid Jet Takeoffs," Aviation Week magazine, June 23, 1958, pages 65, 67, 69 and 70. (Copy in 73–178.)